United States Patent [19]

Creech

[11] Patent Number: 5,958,162
[45] Date of Patent: *Sep. 28, 1999

[54] TIRE WITH A SPECIFIED TWO-PLY STEEL-ARAMID BELT PACKAGE

[75] Inventor: Dean Bradley Creech, Easley, S.C.

[73] Assignee: Michelin Recherche Et Technique, S.A., Switzerland

[*] Notice: This patent is subject to a terminal disclaimer.

[21] Appl. No.: 08/921,129

[22] Filed: Aug. 29, 1997

Related U.S. Application Data

[62] Division of application No. 08/308,909, Sep. 20, 1994, Pat. No. 5,662,751.

[51] Int. Cl.$^6$ ................................. B60C 9/18; B60C 9/20
[52] U.S. Cl. ........................... 152/534; 152/526; 152/536
[58] Field of Search ..................................... 152/526–527, 152/529, 534, 536–538

[56] References Cited

U.S. PATENT DOCUMENTS

| | | |
|---|---|---|
| 3,851,693 | 12/1974 | Takemura et al. . |
| 3,949,797 | 4/1976 | Mirtain et al. . |
| 4,184,529 | 1/1980 | Boileau . |
| 4,184,530 | 1/1980 | Boileau . |
| 4,407,347 | 10/1983 | Mirtain . |
| 4,518,024 | 5/1985 | Matsunuma . |
| 4,854,360 | 8/1989 | Nagumo et al. . |
| 4,865,103 | 9/1989 | Kobayashi et al. . |
| 4,913,208 | 4/1990 | Anderson et al. . |
| 4,936,366 | 6/1990 | Monnot et al. . |
| 5,373,883 | 12/1994 | Kogure et al. . |
| 5,662,751 | 9/1997 | Creech ................................. 152/534 X |

FOREIGN PATENT DOCUMENTS

| | | |
|---|---|---|
| 0568870 | 11/1993 | European Pat. Off. . |
| 2235810 | 1/1975 | France . |
| 2248161 | 5/1975 | France . |
| 2472484 | 7/1981 | France . |
| 2536018 | 5/1984 | France . |
| 2-136304 | 5/1990 | Japan . |
| 907045 | 10/1962 | United Kingdom . |

Primary Examiner—Adrienne C. Johnstone
Attorney, Agent, or Firm—Alan A. Csontos; Robert R. Reed

[57] ABSTRACT

The tire of this invention has a belt package with a combination of a steel reinforced inner belt ply and an aromatic polyamide reinforced outer belt ply. The strength per unit width of the aromatic polyamide reinforced ply is made to be within 30 percent greater than the strength per unit width of the steel reinforced belt ply. The tire of this invention has angles of the aromatic polyamide reinforcing members from the mid-plane greater than the angles of the steel reinforcing members from the same mid-plane by 1 to 8 degrees. High impact endurance values are disclosed to be a function of the difference in bending stiffness values for each ply as well as a function of the composite shear stiffness values.

3 Claims, 5 Drawing Sheets

TIRE WITH A SPECIFIED TWO-PLY STEEL-ARAMID BELT PACKAGE

This is a Divisional of application Ser. No. 08/308,909 filed on Sep. 20, 1994 now U.S. Pat. No. 5,662,751 issued on Sep. 02, 1997.

BACKGROUND OF THE INVENTION

1. Technical Field

The subject matter of this invention relates to radial pneumatic tires for vehicles and particularly to the design and configuration of an improved belt package.

2. Discussion of the Art

The modern day tire must be durable, perform well and be resistant to wear, as well as light in weight and economical to construct. The ability of vehicles to perform at high rates of speed and to have excellent cornering stability remains a desirable feature to the consumer. The tire must produce the higher forces to achieve this performance and at the same time have a smooth ride and absorb shock loads from bumps and holes in the roadway. Another desirable feature of the tire is to resist the penetration of water into the belts which produces corrosion of the reinforcing materials.

Conventional radial tires use multiple belt plies with steel reinforcing materials to achieve vehicle performance. For most applications the tire is sufficiently strong using two steel belt plies. However, these steel reinforced belt plies have a higher mass, do not absorb shock loads very well and are subjected to higher corrosion. One solution to reduce the tire's weight, improve its shock absorbing ability and to make it more resist to corrosion is to use a high modulus textile cord for the reinforcing members in one or more belt plies. An aromatic polyamide cord material has been used to replace steel reinforcing members in some tires with limited success. Improvements in rigidity (stiffness), riding comfort, low cost of manufacture, tire weight, corrosion resistance and belt edge separation have been noted with different designs. However, the need remains to make these improvements to tires even greater; especially to increase their high speed and impact endurance, to increase their ability to resist corrosion, to help them maintain good wear rates and to maintain their relatively low weight. Various designs are discussed below.

Tires having multiple belt plies with at least one ply having aromatic polyamide reinforcing members are disclosed in U.S. Pat. Nos. 3,851,693; 4,184,529; 4,184,530; and 4,407,347 as well as French Patent No. 2,536,018 and Japanese Patent No. 2-136,304. More than two belt plies are disclosed by these patents. Such constructions are of interest in the art as showing the use of an aromatic polyamide material for a belt ply reinforcement.

U.S. Pat. No. 4,184,529 teaches a belt package for an off-road tire used on heavy vehicles. This belt package has three belt plies reinforced with steel cables and the possibility to use synthetic textile reinforcing members is mentioned.

The reinforced belt package of U.S. Pat. No. 4,184,530 includes a single inner belt ply having aromatic polyamide reinforcing members and a single outer belt ply having metallic reinforcing members; plus two belt edge strips having textile reinforcing members. The angle of the aromatic polyamide belt ply reinforcing members from the mid-plane is less than the angle of the steel belt ply reinforcing members. Other patents also show the inner belt having aromatic polyamide reinforcing materials. In U.S. Pat. No. 4,407,347 two inner belt plies preferably have aromatic polyamide reinforcing members disposed at 15 to 30 degrees plus an outer belt with steel reinforcing members disposed at 60 to 90 degrees. The belt package further includes two lateral strips that adjoin the steel reinforced belt ply at both edges.

Two additional patents which also include a belt package with auxiliary layers or cover plies are French Patent 2,536,018 and Japanese Patent 2-136,304. These patents use an inner belt ply having steel reinforcing members a middle belt ply having aromatic polyamide reinforcing members and an outer cap ply of nylon or polyester reinforcing material at 0 to 10 degrees. A wide range of angles is given for the reinforcing materials in each of the two inner plies, being from 0 to 35 degrees, and the angles in respective plies are not the same. The claims of 2-136,304 are further discussed below.

A number of patents disclose the use of a belt ply comprising aromatic polyamide reinforcing members where one or more of the belt plies are folded to give improved endurance of the belt package. These include U.S. Pat. Nos. 3,949,797 and 4,854,360 and French Patent Nos. 2,235,810 and 2,472,484. The use of folded belts allows certain performance improvements, however, the cost of making tires with folded belt packages is increased by their relatively complex construction requirements. Also, these tires have greater mass as a result of the folded belt plies.

A number of patents illustrate only two unfolded belt plies in the belt package with one belt ply having aromatic polyamide as a reinforcing material. French Patent No. 2,248,161 discloses a belt package with a single outer belt ply having steel reinforcing members and a single inner belt ply having aromatic polyamide (aramid) reinforcing members. The angles of the reinforcing members are briefly mentioned in the disclosure as being "normal" values, without further definition. The aramid belt ply is wider than the steel belt ply in this disclosure. In U.S. Pat. No. 4,936,366 the single unfolded aromatic polyamide reinforced belt ply can be the inner belt ply or the outer belt ply, and the same is true with the other unfolded steel reinforced belt ply. This patent requires the angles of the steel reinforcing members to be greater than the angles of the aromatic polyamide reinforcing members by 1 to 6 degrees. This angular relationship is specified to substantially equalize the bending stiffness between the two belt plies. This stiffness relationship should allow the two belt plies to be interchanged. Angles of the steel reinforcing members are in a range of 18 to 25 degrees where the angles of the aromatic polyamide reinforcing members are in a range of 17 to 24 degrees. The width of the inner belt ply may be equal to the width of the outer belt ply with both equal to or slightly greater than the tread width. The disclosed breaking strength of the 2×0.30 millimeter high strength steel reinforcing members is much lower than the disclosed braking strength of the 1670×3 aromatic polyamide reinforcing members. Also, the pace (spacing) of the steel reinforcing members in U.S. Pat. No. 4,936,366 is disclosed to be less than the pace of the aromatic polyamide reinforcing members.

In U.S. Pat. No. 3,851,693 all of the examples described in the specification (no drawings) concern three belt plies consisting of two conventional steel reinforced layers and one textile reinforced layer (rayon or aromatic polyamide). The steel reinforcing members are at 15 degrees from a mid-plane and the textile reinforcing members are at 32 degrees from this same plane. For future discussions in this specification the angles are assumed to be measured relative to the mid-plane unless otherwise specified. A further discussion of the claims of this patent follows.

Two patents illustrate belt packages with more than two belt plies but claim a tire with only two belt plies. In U.S. Pat. No. 3,851,693 two steel reinforced belt plies and one aromatic polyamide reinforced belt ply are described and compared in the examples. In claim 1 only a single steel belt ply is claimed with steel reinforced belt members having an angle of 5 to 25 degrees and the other ply has aromatic polyamide reinforcing members having an angle of 0 to 45 degrees. Angles used in the examples were 15 degrees for the steel members and 32 degrees for the aromatic polyamide members. Specific values for the steel cable twist coefficient, modulus of the reinforcing members and the modulus of the rubber at 300 percent elongation are claimed parameters to achieve high speed performance. The tenacity, modulus and twisting coefficient for the aromatic reinforcing members are also a part or this claimed invention. Such material parameters are narrow in scope in comparison to the very broad scope when using both material properties and stiffness variations which result from varying the number of the reinforcing members per unit width in each belt ply. Individual stiffness values or relative stiffness properties between the two belt plies are not design parameters used for the tire of this reference.

Japanese Patent No. 2-136,304 also has only examples of tires with three belt plies, including a cap ply having nylon reinforcing members. This patent claims a belt package with two plies; one being a single inner belt ply reinforced with steel members and the other a single outer aromatic polyamide reinforced belt ply. The first angle of the steel reinforcing members is from 0 to 30 degrees and the second angle of the aromatic polyamide reinforcing members is set to be larger than the first angle and also in a range of 0 to 30 degrees. The angles used in an example are 22 degrees for the steel reinforcing members and 30 degrees for the aromatic polyamide reinforcing members. The patent is silent in regard to the pace of the reinforcing members, but the plies are designed such that the in-plane and out-of-plane stiffnesses of the aromatic polyamide reinforced belt ply are less the same stiffnesses of the steel reinforced belt ply that it replaces. To compensate for this and maintain the in-plane bending rigidity of the belt package the angle of the steel reinforcing members is made less than the angle of the aromatic polyamide reinforcing members. The belt package stiffness also relies on the "triangular truss structure" made possible by the nylon cap ply used in the examples.

Whereas the art defines reinforcing member angles over a very wide range of values, no specific information is provided on the density of the belt reinforcing members (pace) to achieve specific belt ply strength and stiffness values and parametric relationships between the two plies. The need exists to define the structural parameters of a steel reinforced inner belt ply along with an aromatic polyamide reinforced outer belt ply in sufficient detail such that the tire has less weight and continues to perform as well as or better than a tire with two steel reinforced belts. This includes defining the physical properties of the belt reinforcing and rubber matrix materials as well as the density of reinforcing members in each ply, their angles from the mid-plane of the tire and stiffness values for the two belt plies and the belt package.

SUMMARY OF THE INVENTION

An object of this invention is to define a low mass belt package for a radial pneumatic tire having an endurance equal to or greater than a standard low cost tire having a belt package with two metallic reinforced belt plies. The tire shall not have folded belts and cap plies so that it can be economically manufactured.

Another object of this invention is to teach how to utilize the density and angles of the reinforcing members for a metallic reinforced first belt ply and an aromatic polyamide reinforced second belt ply of the belt package to yield a belt package having a balanced strength per unit width relationship between respective plies and stiffness values that yield improved high impact endurance and corrosion performance.

A further objective of this invention is to achieve a low mass tire having an improved speed rating over prior art tires without degradation of the wear life of the tire.

In particular, this invention is a radial pneumatic tire comprising a toroidal carcass having at least one reinforced ply extending from a first bead portion to an axially displaced second bead portion. The tire further comprises a circumferentially extending ground engaging tread portion disposed radially outward of a crown portion of the carcass. A sidewall portion extending radially inward from each axial edge of the tread portion to a respective bead portion; and a belt package between the tread portion and the crown portion which has a predetermined width and which consists of a single unfolded first belt ply having essentially parallel metallic reinforcing members at a first angle from the mid-plane of the tire and is positioned radially outward of the carcass, and a single unfolded second belt ply having essentially parallel aromatic polyamide reinforcing members at a second angle from the mid-plane of the tire, and positioned radially outward of the first belt ply. The belt package is further characterized in that the first angle is less than the second angle by at least one degree wherein: (1) the breaking strength of each of the individual metallic reinforcing members is greater than a breaking strength of each of the individual aromatic polyamide reinforcing members; and (2) a strength per unit width of the second belt ply in a circumferential direction is within zero to 30 percent greater than another strength per unit width of the first belt ply in the circumferential direction.

In another embodiment of this invention the pneumatic tire comprises a toroidal carcass having at least one reinforced ply extending from a first bead portion to an axially displaced second bead portion; a circumferentially extending ground engaging tread portion disposed radially outward of a crown portion of the carcass. A sidewall portion extending radially inward from each axial edge of the tread portion to a respective bead portion; and a belt package between the tread portion and the crown portion having a predetermined width and which consists of a single unfolded first belt ply having essentially parallel metallic reinforcing members at a first angle from the mid-plane of the tire and is positioned radially outward of the carcass, and which consists of a single unfolded second belt ply having essentially parallel aromatic polyamide reinforcing members at a second angle from the mid-plane of the tire and positioned radially outward of the first belt ply. The belt package is further characterized in that the first angle is less than the second angle by at least one degree wherein: (1) the breaking strength of each of the individual metallic reinforcing members is greater than the breaking strength of each of the individual aromatic polyamide reinforcing members; and (2) the bending stiffness of the first belt ply about a lateral y-axis has a value in the range of about 5 percent to about 150 percent greater than the bending stiffness of the second belt ply about the lateral y-axis where the lateral y-axis is parallel to a rotational axis of the tire.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF PREFERRED EMBODIMENTS

Figure 1:
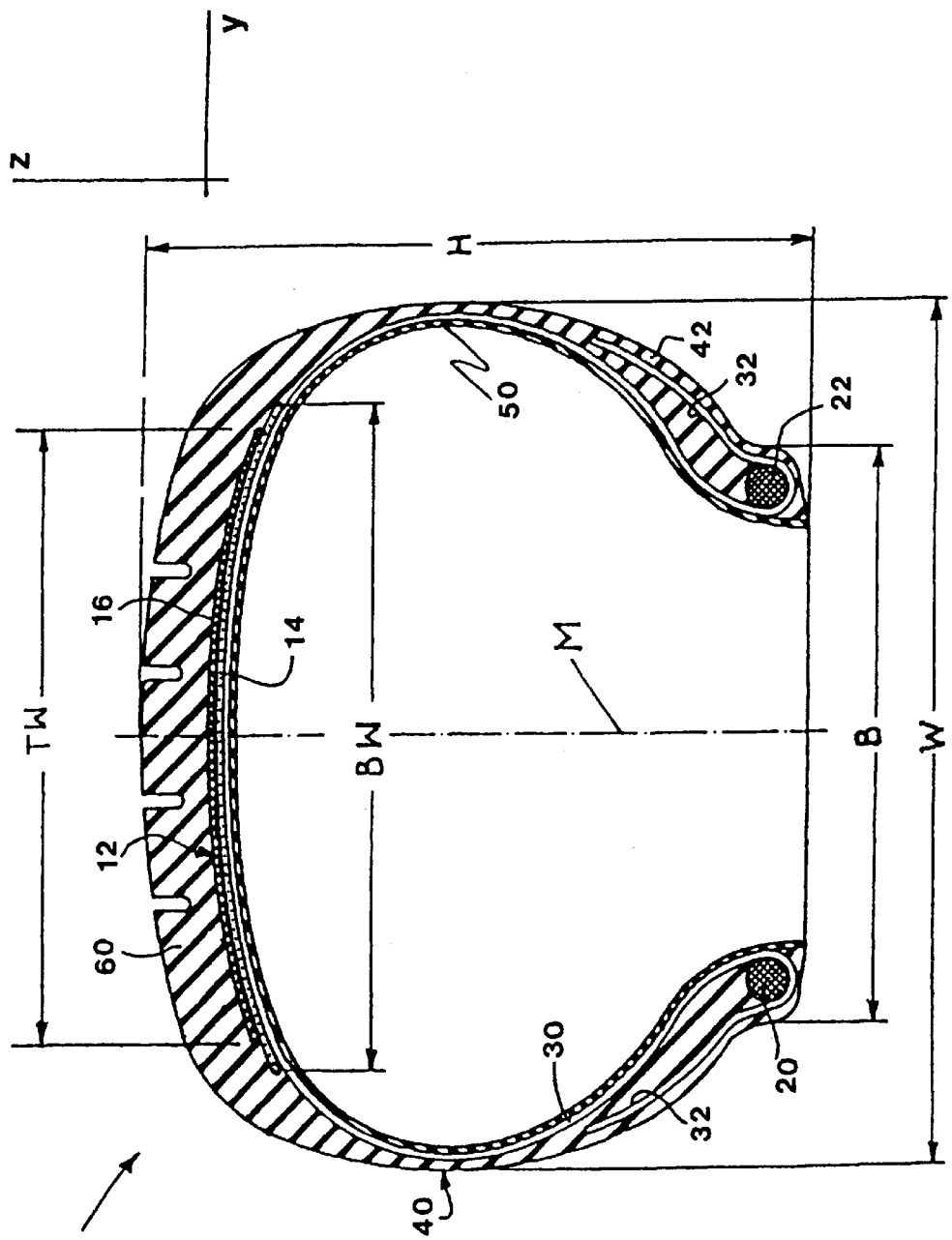
FIG. 1 is a cross-sectional view of the tire showing a belt package having two belt plies in accordance with this invention.

The tire of this invention is a radial pneumatic tire suitable for use on a passenger car, sports car, light truck or like vehicle. The objective of a low cost and light weight tire is achieved by using relatively simple construction methods. No cap plies are used with the tire of this invention, and the carcass plies as well as the bead construction are standard in the industry. A cross-sectional view of the tire of this invention is illustrated in FIG. 1. The tire 10 maintains its air pressure by having an innerliner portion 50.

The tire 10 of this invention as illustrated in FIG. 1 has a toroidal cross-section formed by a carcass. The toroidal carcass 30 has at least one reinforced ply extending from a first bead portion 20 to an axially displaced second bead portion 22. Each end 32 of the carcass 30 wraps around a respective bead 20 or 22 and extends radially outward from the bead. The radial direction is that associated with the z-axis direction extending outward from the bead toward a tread 60 of the tire. The tread 60 has a tread width TW being a widthwise portion of the tire in the lateral y-axis direction that contacts a surface supporting the tire. A sidewall portion 40 extends radially inward from each lateral edge of the tread portion 60 to a respective bead 20 or 22.

Figure 2:
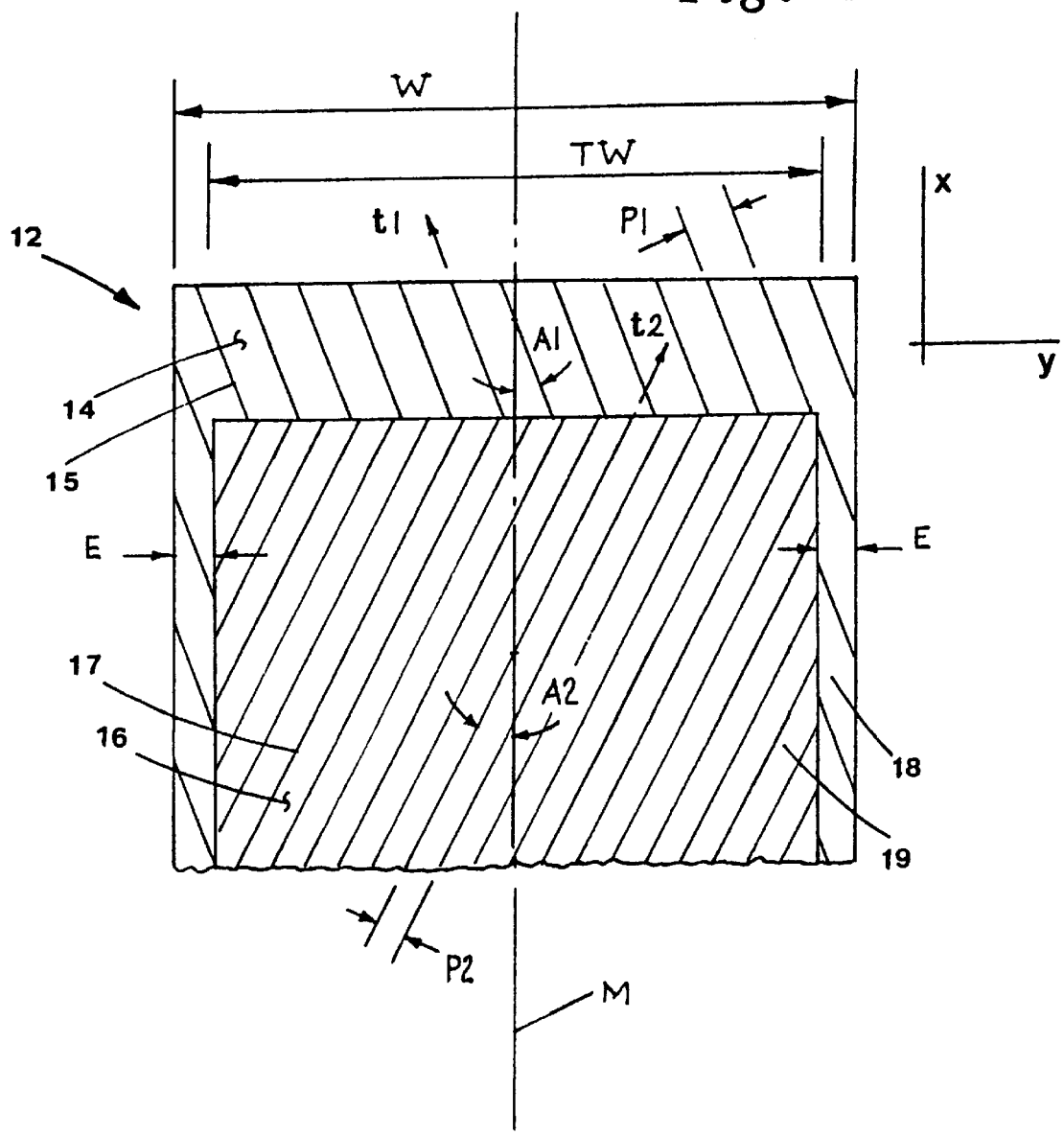
FIG. 2 is a plan view of the belt package of this invention showing the reinforcing members in each ply.

A belt package 12 is located between the crown of the carcass and the tread as illustrated in FIG. 1. The belt package 12 has a lateral width being a predetermined value consistent with the tread width TW. The belt package consists of a first belt ply 14 located radially outward of the crown of the carcass and radially inward of the tread 60. The first belt ply 14 preferably has a lateral width value in the range of about 100 to about 105 percent of the tread width TW. The belt package 12 also consists of a second belt ply 16 being radially outward of the first belt ply 14 and also radially inward of the tread 60. The second belt ply preferably has a lateral width value of about 90 percent to about 100 percent of the tread width TW. The first belt ply 14 is made to have a lateral width at least 5 percent greater than the lateral width of the second belt ply 16. An edge distance E between the inner belt ply 14 and the outer belt ply 16 is shown in FIG. 2. The belt plies are symmetrical about the mid-plane M and the edge distance E exists at both edges. The construction of the belt package 12 is illustrated in FIG. 2, as viewed radially inward from the tread side of the tire. The first belt ply 14 has metallic reinforcing members 15 disposed at a first angle A1 from the mid-plane M of the tire. A first spacing or pace P1 between adjacent essentially parallel metallic reinforcing members 15 is exaggerated in this illustration to clearly show their orientation. The breaking strength of each individual reinforcing member is illustrated by force t1. The metallic reinforcing members 15 are preferably made of steel wires having two to four wires. Each wire can have a 0.23 to 0.32 millimeter diameter and is made with carbon steel having about 0.70 percent to about 0.80 percent of carbon by weight. The preferred diameter is 0.28 millimeter. The steel reinforcing members are commonly designated in the industry as 2×0.28, 3×0.28 or 4×0.28 normal strength steel reinforcing members. A twist rate standard in the industry is also used. The preferred metallic reinforcing member for this invention is the 4×0.28 member. The breaking strength t1 of the steel reinforcing members has a value in the range of about 30 deca Newtons (daN) to about 65 daN. The tensile modulus of elasticity for the steel reinforcing members is in a range of about 120 giga Pascals (GPa) to about 185 GPa. The preferred tensile modulus of the metallic reinforcing member is approximately 170 GPa. Other cables can be used within the scope of this invention including member designations 2×0.30 and 4×0.23. members. An essential factor in this invention is the pace P1 of the steel reinforcing members to achieve predetermined strength and stiffness values for the first belt ply 14 in relation to the second belt ply 16. A pace P1 in the range of about 1.00 millimeter to about 1.70 millimeter is anticipated. The preferred pace P1 of the steel reinforcing members is about 1.60 millimeters for the preferred tire 10 of this invention.

The second belt ply has aromatic polyamide reinforcing members 17 disposed at a second angle A2 from the mid-plane M, in a direction opposite to the first angle A1. A second spacing or pace P2 between the essentially parallel aromatic polyamide reinforcing members 17 is amplified to illustrate their relative orientation. The breaking strength of the aromatic polyamide reinforcing members is illustrated by the second force t2. The aromatic polyamide members preferably have a two ply construction with a diameter in the range of about 0.55 millimeter to about 0.70 millimeter. The aromatic polyamide reinforcing members 17 preferably have a mass per length of 1500 grams/9000 meters (denier), commonly referred to as 1500×2 denier cords. The breaking strength t2 of the aromatic polyamide reinforcing members is preferably a value in the range of about 30 daN to about 50 daN. The pace P2 has a value in the range of about 0.90 millimeter to about 1.45 millimeters. The preferred pace P2 of the aromatic polyamide reinforcing members has a value of about 0.95 millimeters for the preferred tire 10 of this invention. A three ply cord construction, being 1500×3, is also within the scope of this invention. The tensile modulus of elasticity of the aromatic polyamide members, being a secant modulus at 1–2 percent unit strain, is in the range of about 20 GPa to about 23 GPa. A ratio of the breaking strengths t1/t2 for the preferred belt package reinforcing members 15 and 17 of this invention is preferably in a range of values of 1.05 to 1.75. That is, $$1.05 < t1/t2 < 1.75$$

To balance the load taken by the respective belt plies 14,16 of the belt package 12 and produce a belt package having greater endurance, a "ply strength" or strength per unit width in the circumferential direction is specified for the tire 10 of this invention. The strength per unit width (T) of a belt ply can be expressed by the equation:

$$T = \frac{t}{P}\cos^2 A$$

where t is the breaking strength of a respective reinforcing member, A is the respective angle between a longitudinal extent of the reinforcing members and a mid-plane M and P is a respective spacing of the reinforcing members. The strength per unit width is defined for both the first ply 14 and the second ply 16, and a system of equations can be written as follows:

$$T1 = \frac{t1}{P1}\cos^2 A1, \text{ply 14 (first)}$$

$$T2 = \frac{t2}{P2}\cos^2 A2, \text{ply 16 (second)}$$

There are three independent variables t, P and A for each dependent variable T. Any one or all of the independent variables can be changed to affect the strength per unit width T. Alternately, two or more independent variables can be changed without changing the dependent variable T (i.e., the angle A can increase along with a decrease in spacing P to give the same T). The ability to change T1 and T2 by changing either respective angles A1 and A2, respective breaking strengths t1 and t2 or respective spacings P1 and P2 is essential to be able to adjust the relative value of T1 with respect to T2 for the different reinforcing members of this invention. The independent variables are illustrated in FIG. 2. The improved belt package is characterized by a relative strength per unit width between each respective belt to yield a balanced design. That is, defining the relationship of the dependent variable T1 with respect to dependent variable T2 is essential to achieve the objectives of this invention. Preferably, the relative strengths per unit width are such that:

T1<T2<1.3×T1 within the range of-angles A1,A2 given herein for each ply. By definition, these values of T1 and T2 are also a function of the breaking strengths t1,t2 and the reinforcing member spacings P1,P2 as defined herein.

The angles A1 and A2 of the reinforcing members from the mid-plane M are selected to help give relative strength per unit width values within defined limits. The angles can be easily changed to vary strength per unit width values of each belt ply to achieve a balanced strength per unit width relative value between the two belt plies. A balanced design based on relative strength per unit width values between the two belt plies (T1 vs. T2) is achieved by having a predetermined value of strength per unit width known to give improved tire endurance. It has been determined that a T1 value of approximately 350 deca Newtons per centimeter gives a well balanced design.

Having selected the reinforcing members with breaking strengths in the range of values disclosed herein, the angle A of the reinforcing members is selected for each belt ply 14,16 to best conform to low cost manufacturing, and to be within a reasonable range of values to keep the members in tension. Belt ply reinforcing members have much more endurance in resisting tensile forces. A large angle range, as taught by the art, is not practicable. The steel reinforcing members 15 are positioned so that the first angle A1 with respect to the mid-plane M is in a range of values of about 20 degrees to about 28 degrees. The aromatic polyamide reinforcing members 17 are positioned such that the second angle A2 from the mid-plane M is in a range of values of about 22 degrees to about 29 degrees.

Figure 3:
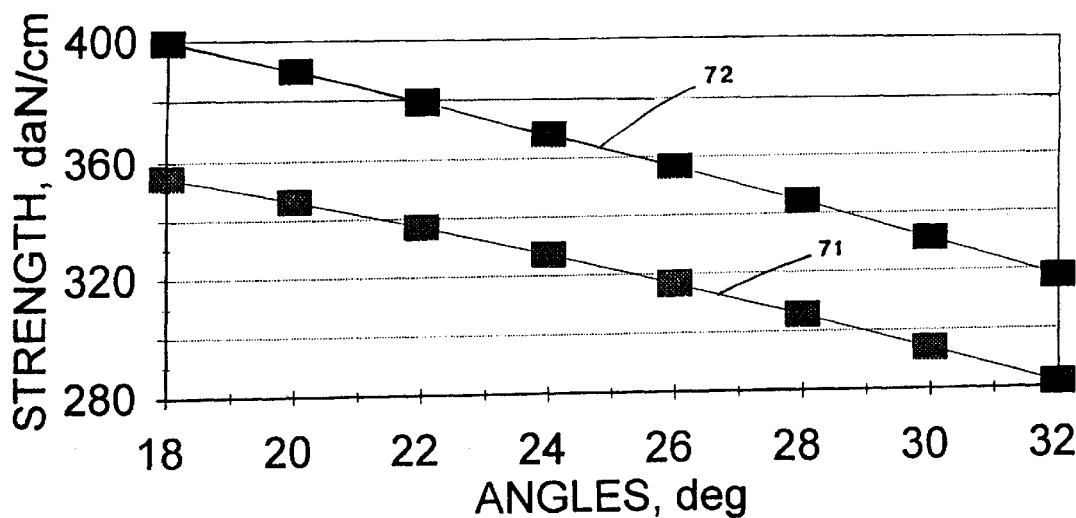
FIG. 3 is a graph showing the relative strength per unit width of the two plies of a belt package of one embodiment of this invention.
Figure 4:
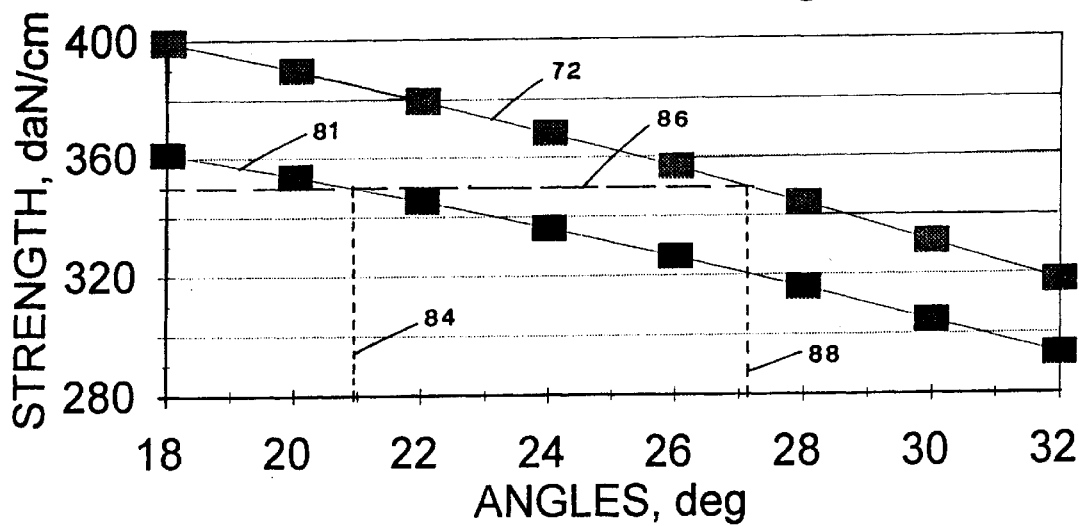
FIG. 4 is a graph showing the relative strength per unit width of the two plies of the preferred belt package of this invention.

The pace P of reinforcing members in each of the belt plies is adjusted to substantially yield a preferred strength per unit width value. Preferred values for the first strength per unit width T1 are in a range of values from about 275 deca Newtons per centimeter (daN/cm) to about 400 daN/cm. For a balanced design the relative strength per unit width values (T1 vs. T2) are selected such that a second strength per unit width value T2 of the second belt ply 16 in a circumferential direction is within zero to 30 percent greater than the first strength per unit width value T1 of the first belt ply 14 in the same circumferential direction. The preferred second strength per unit width T2 is in a range of values from about 390 daN/cm to about 450 daN/cm. For example, the graphs of FIGS. 3 and 4 show relative strength per unit width values within 30 percent of each other for a belt package. In this example, the values of breaking strength t are known using the reinforcing members of this invention and the pace P has been selected to make T2 within zero to 30 percent greater than the value of T1 over a range of preferred angular values A1 and A2.

The graphs of FIGS. 3 and 4 further show what the effect of changing the angle A of the reinforcing members has on the strength per unit width T values. The strength per unit width is simply called "strength" in the graphs. The curve 71 of FIG. 3 shows the value of the first strength per unit width T1 of the first belt ply 14 in the circumferential direction as a function of the angle A1 using 3×0.28 steel reinforcing members. The curve 81 of FIG. 4 shows the same first strength per unit width T1 as a function of the angle A1 using the preferred 4×0.028 reinforcing members. The curve 72 of both FIG. 3 and FIG. 4 shows the value of the second strength per unit width T2 of the second belt ply 16 in the circumferential direction as a function of the angle A2 of the preferred 1500×2 aromatic polyamide reinforcing members. To make the strength per unit width equal in both belt plies in FIG. 4, select an angle A1 of about 21 degrees for the steel reinforcing members and project the vertical line 84 to the curve 81. A horizontal line 86 corresponding to a value of 350 deca Newtons per centimeter (daN/cm) is projected to curve 72 for the aromatic polyamide reinforcing member. An intersection with curve 72 is projected vertically by line 88 to give an angle A2 of about 27 degrees for the aromatic polyamide reinforcing members. Therefore, for this example, an angle difference of six degrees will give a completely balanced design by having equal belt ply stiffness per unit width values for the two belt plies 14,16. Once again, the preferred second strength per unit width T2 of the second belt ply in a circumferential direction is within zero to 30 percent greater than the first strength per unit width T1 of the first belt ply in the same circumferential direction.

In another embodiment of this invention the same tire 10 is further made to have a high impact endurance. This type of endurance is associated with a tire that is resistant to shock loading from road hazards, bumps, pot holes and the like in a roadway. These loading conditions greatly reduce the overall endurance of the tire and have been found to be associated with certain stiffness values of the individual belts, as well as the composite belt package. There are five different stiffness values that characterize each belt plus the belt package of the tire. These values can be calculated for individual belt plies as well as for the total belt package. Two values are extensional stiffness values, two are bending stiffness values and one is a shear stiffness value. Methods to calculate these stiffness values for composite materials are well known in the art. The mathematics is outlined by the matrix equations in "Mechanics of Composite Materials" by Robert M. Jones, which was published by Hemisphere Publishing Corp. in 1975. In particular, these matrix equations are written in terms of the middle surface extensional strains and curvatures as summarized in section 4.4.1 of this reference. The method is well known in the tire industry where bending stiffness is defined using beam theory over a unit width of the belt ply and shear stiffness is defined according to plate theory as being proportional to the cube of the belt ply thickness. This material is included herein by reference.

Figure 5:
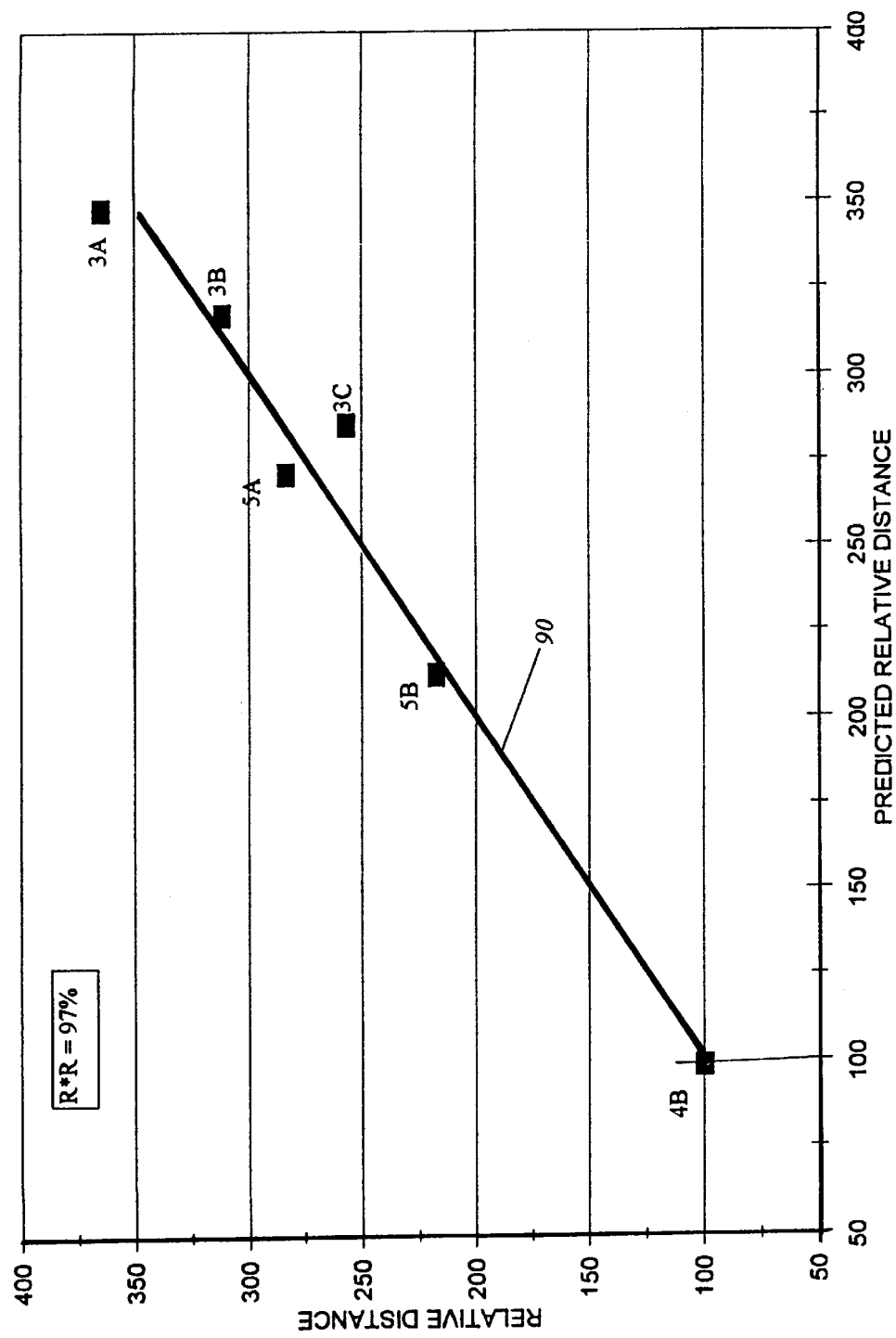
FIG. 5 is a graph of actual vs. predicted high impact endurance values for six test tires.

High impact endurance HIE was found to have a direct correlation with the relative bending stiffness about the lateral y-axis (FIG. 2) between individual belt plies, as well as the composite shear stiffness of the belt package in the x-y plane. The relationship for high impact endurance (HIE) as a function of stiffness values, was determined to be $$HIE = FUN[(BY1-BY2), CGZ]$$

where the independent variables are BY1–BY2 and CGZ. The parameter BY1 is the bending stiffness of the first belt ply about the lateral y-axis, parameter BY2 is the bending stiffness of the second belt ply about the lateral y-axis and parameter CGZ is the composite shear stiffness of the belt package in the x-y plane (about the z-axis). The value of HIE is the distance traveled by the tire during a high impact endurance test before it fails. The HIE is directly proportional to the difference in bending stiffness values BY1–BY2 as well as the composite shear stiffness CGZ. Proportionality coefficients can be determined from a correlation analysis for each tire size and construction using high impact endurance test values. For example, FIG. 5 shows a 1:1 curve 90 for an exact correlation of predicted vs. actual HIE values; with the results of six test tires 3A, 3B, 3C, 4B, 5A and 5B plotted relative to the exact correlation curve. The high impact endurance magnitudes shown are relative to tire 4B having a value of 100. Proportionality coefficients were obtained for this test series of six tires. The standard R×R confidence factor was 0.97 for this high impact test example; being an excellent correlation of actual test data with that predicted by the functional relationship for HIE. The relative magnitude of the high impact endurance values are accurately predicted by the HIE functional relationship.

From the high impact endurance functional relationship HIE=f(BY1,BY2,CGZ) above, it is noted that improved endurance exists when the bending stiffness difference BY2–BY1 is negative; such that this term increases the magnitude of HIE. That is, the bending stiffness BY1 of the first belt ply about the lateral y-axis should be made greater than the bending stiffness BY2 of the second belt ply about the same lateral y-axis. Optimum values for BY2–BY1 with respect to CGZ can be achieved to maximize the high impact endurance HIE value. Values of bending stiffness BY1 in the range of about 5 percent to about 150 percent greater than the bending stiffness BY2 have been determined as optimum for various tire designs. Preferably the bending stiffness BY1 of the first belt ply is at least 45 percent greater than the bending stiffness BY2 of the second belt ply about respective lateral y-axes. The relative magnitude of the bending stiffness BY2–BY1 is an essential factor for improved high impact endurance, while maintaining a relatively high composite shear stiffness CGZ value. The preferred composite shear stiffness value is greater than about 2500 mega Pascal millimeters.

Figure 6:
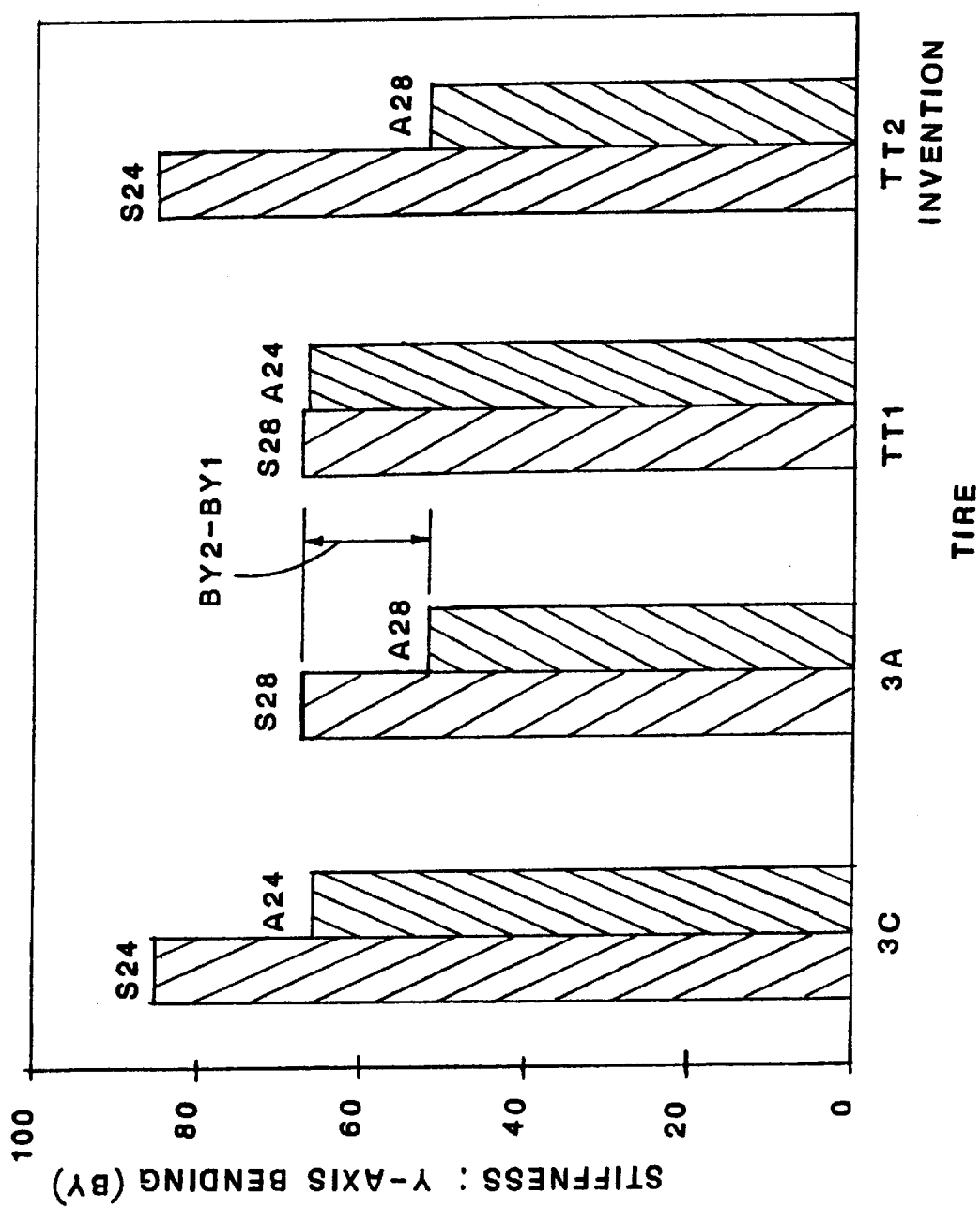
FIG. 6 is a bar graph showing the bending stiffness of each belt ply for four possible belt package configurations.

The bar graph of FIG. 6 illustrates the relative bending stiffness BY2–BY1 of belt plies in four test tires 3C, 3A, TT1 and TT2 having different belt package constructions. The same steel reinforcing members (4×0.28) having the same pace (1.60 millimeters) is used in each first belt ply of each tire and the same aromatic polyamide reinforcing members (1500×2) having the same pace (0.94 millimeter) is used in each second belt ply of each tire. The left vertical bar of each set of bars is for the first belt ply 14 and the vertical bar on the right is for the second belt ply 16 of the belt package 12. The tires 3C and 3A are the same tires as illustrated in FIG. 5. The bar designated S24 is for a steel reinforced first belt ply 14 with reinforcing members at 24 degrees from the mid-plane M of the tire 10. The bar designated A28 is for a aromatic polyamide reinforced second belt ply 16 with reinforcing members at 28 degrees from the mid-plane M. Relative values of the bending stiffness, called "stiffness" in the graph, are given based on a range of values from 0 to 100. Note that a much greater relative bending stiffness BY2–BY1 is possible using the test tire TT2 of this invention; where the steel reinforcing members are at 24 degrees and the aromatic polyamide reinforcing members are at 28 degrees.

The high impact endurance HIE functional relationship also shows a correlation with composite shear stiffness CGZ about the z-axis. A tire 10 having a higher composite shear stiffness will yield a tire having a larger high impact endurance when all other factors are the same. Tire 3A has the same relative bending stiffness BY2–BY1 as tire 3C in FIG. 6, however, the composite shear stiffness of tire 3A is greater than that of tire 3C such that the overall high impact endurance HIE of tire 3A is greater than that of tire 3C (see FIG. 5).

The parameters that yield a balanced strength per unit width relationship also result in a higher impact endurance. It is essential to have the angle A1 of the steel reinforcing members less than the angle A2 of the aromatic polyamide reinforcing materials for the preferred reinforcing materials of this invention. Angular differences A2–A1 can be in a range of values from about 1 degrees to about 8 degrees. The preferred difference A2–A1 is approximately 3 degrees.

The stiffness of the belt plies are not only a function of the tensile modulus of the reinforcing members, the spacing or pace P of the reinforcing members and the angle A of reinforcing members from the mid-plane M, but also the thickness and material properties of the rubber matrix material within each belt ply. The modulus of elasticity of the rubber matrix material 18,19 (FIG. 2) at ten percent unit strain is in a range of values of about 5 mega Pascals (MPa) to about 25 MPa. The preferred rubber modulus of elasticity at ten percent unit strain is 11 MPa for the tires 10 of this invention. The thickness of the green rubber skim on each side of each of the reinforcing members of the belt package has a value in the range of about 0.35 millimeter to about 0.90 millimeter. The green rubber skim thickness on each side of the steel reinforcing members 15 is preferably 0.65 millimeters and the green rubber skim thickness on each side of the aromatic polyamide reinforcing members 17 is preferably 0.40 millimeters. Other skim thickness values are also possible within the scope of this invention. Rubber material properties and skim thickness values are selected to give the low cost light weight durable tire of this invention.

EXPERIMENTAL EVIDENCE

The tire of this invention has a balanced strength per unit width relationship between each belt ply in the circumferential direction, a large difference in the bending stiffness about a lateral y-axis between the two belt plies and a relatively large composite shear stiffness of the belt package in the plane of the belt plies. Experimental evidence has shown that this tire 10 has improved running endurance as well as high impact endurance. The tire has a relatively low mass by using a second belt with aromatic polyamide reinforcing members. In addition, the reduced pace of the aromatic polyamide reinforcing members is such that corrosion of the first steel reinforced belt ply is reduced.

A passenger car tire having a first ply with steel reinforcing members and a second ply with aromatic polyamide reinforcing members (aramid cords) was compared with a witness tire having both plies with steel reinforcing members. Both tires were of the same P185/65 R14 size and construction. The steel reinforced belt plies were all reinforced with 4x0.28 steel reinforcing members at an angle 1 of 20 degrees and the aromatic polyamide reinforced belt ply was reinforced with 1500/2 aromatic polyamide reinforcing members also at an angle A2 of 23 degrees. The pace of the steel members was 1.60 millimeters and the pace P2 of the aromatic polyamide reinforcing members was at 0.95 millimeters. The following table shows a comparison of physical parameters.

| PARAMETER | WITNESS TIRE steel reinf. 1st ply steel reinf. 2nd ply | STEEL-ARAMID TIRE steel reinf. 1st ply aromatic polyamide reinf. 2nd ply |
| --- | --- | --- |
| MASS (kilograms) | 7.1 | 6.8 |
| HIGH SPEED LIMIT (relative) | 100 (ref.) | 114 |
| UTQG TEMPERATURE (relative) | 100 (ref.) | 108 |
| WEAR RATE most worn rib (relative) | 100 (ref.) | 75 |

Other performance parameters were essentially the same in this test comparison. Handling and comfort of the tires were also approximately equal. Further parametric improvements were obtained when the aromatic polyamide reinforcing members of the second belt ply were disposed at an angle A2 from the mid-plane between 1 to 8 degrees larger than the disposed angle A1 of the steel reinforcing members of the first belt ply. An improvement in the high impact endurance HIE of tire TT2 of FIG. 6 over the above witness tire is anticipated to be at least 10 percent.

Consider the two tires TT1 and TT2 of FIG. 6 as having the same construction except for the angle A1 of the steel reinforcing members relative to the angle A2 of the aromatic polyamide reinforcing members. The tire TT1 with A1>A2 has a composite shear modulus CGZ 4 percent greater than tire TT2 with A1<A2. However, tire TT2 has a calculated high impact endurance HIE which is 6.2 percent greater than the HIE for tire TT1.

From the above description of the preferred embodiments of the invention, those skilled in the art will perceive improvements, changes and modifications. Such improvements, changes and modifications within the skill of the art are intended to be covered by the appended claims.

Having described the embodiments of the invention what is claimed is:

1. A radial pneumatic tire comprising:

a toroidal carcass having at least one reinforced ply extending from a first bead portion to an axially displaced second bead portion;

a circumferentially extending ground engaging tread portion disposed radially outward of a crown portion of the carcass;

a sidewall portion extending radially inward from each axial edge of the tread portion to a respective bead portion;

a belt package between and adjacent both the tread portion and the crown portion of the carcass and having a predetermined width and consisting of a single unfolded first belt ply having essentially parallel metallic reinforcing members at a first angle from a mid-plane and positioned radially outward of the carcass and a single unfolded second belt ply having essentially parallel aromatic polyamide reinforcing members at a second angle from the mid-plane and positioned radially outward of the first belt ply, said first angle being less than said second angle by at least about one degree, wherein (1) the breaking strength of each of the individual metallic reinforcing members is greater than the breaking strength of each of the individual aromatic polyamide reinforcing members, and (2) a strength per unit width of the second belt ply in a circumferential direction is within zero to 30 percent greater than a strength per unit width of the first belt ply in the circumferential direction; and said belt package having a bending stiffness of the first belt ply about a lateral y-axis in a range of about 5 percent to about 150 percent greater than a bending stiffness of the second belt ply about the lateral y-axis, said lateral y-axis being parallel to a rotational axis of the tire.

2. A radial pneumatic tire comprising:

a toroidal carcass having at least one reinforced ply extending from a first bead portion to an axially displaced second bead portion;

a circumferentially extending ground engaging tread portion disposed radially outward of a crown portion of the carcass;

a sidewall portion extending radially inward from each axial edge of the tread portion to a respective bead portion;

a belt package between and adjacent both the tread portion and the crown portion of the carcass and having a predetermined width and consisting of a single unfolded first belt ply having essentially parallel metallic reinforcing members at a first angle from a mid-plane and positioned radially outward of the carcass and a single unfolded second belt ply having essentially parallel aromatic polyamide reinforcing members at a second angle from the mid-plane and positioned radially outward of the first belt ply, said first angle being less than said second angle by at least one degree, wherein (1) the breaking strength of each of the individual metallic reinforcing members is greater than the breaking strength of each of the individual aromatic polyamide reinforcing members and (2) a bending stiffness of the first belt ply about a lateral y-axis is in a range of values of about 5 percent to about 150 percent greater than a bending stiffness of the second belt ply about the lateral y-axis, said lateral y-axis being parallel to a rotational axis of the tire; and said belt package is further characterized by a strength per unit width for each belt ply in a circumferential direction, wherein a strength per unit width of the second belt ply in the circumferential direction is within zero to 30 percent greater than a strength per unit width of the first belt ply in the circumferential direction.

3. The tire set forth in claim 2, wherein the strength per unit width of the first belt ply has a value in the range of about 275 deca Newtons per centimeter (daN/cm) to about 400 daN/cm and the strength per unit width of the second belt ply has a value in the range of about 390 daN/cm to about 450 daN/cm.

* * * * *